United States Patent [19]

Fujiyama et al.

[11] 4,094,028
[45] June 13, 1978

[54] AUTOMATIC INFLATING LIFESAVING BUOY

[75] Inventors: Hikaru Fujiyama; Tsuneo Kasama, both of Kawagoe; Shigenobu Higuchi, Ashikaga, all of Japan

[73] Assignees: Nippon Oil and Fats Co., Ltd.; Kokuku Chemical Industry Co. Ltd., both of Tokyo, Japan

[21] Appl. No.: 781,424

[22] Filed: Mar. 25, 1977

[30] Foreign Application Priority Data

Apr. 1, 1976  Japan .................. 51-35126

[51] Int. Cl.² ............................... B63C 9/18
[52] U.S. Cl. ........................ 9/321; 149/35; 222/3
[58] Field of Search ............... 9/314, 316, 321–326; 222/3; 23/281; 149/35; 429/118, 119

[56] References Cited

U.S. PATENT DOCUMENTS

| 2,981,616 | 4/1961 | Boyer | 149/35 |
| 3,246,801 | 4/1966 | DeBoer | 9/325 |
| 3,305,319 | 2/1967 | Kowalick et al. | 23/281 |
| 3,515,518 | 6/1970 | Halstead et al. | 9/321 |
| 3,649,363 | 3/1972 | Morehouse et al. | 429/118 |
| 3,669,311 | 6/1972 | Folden, Jr. et al. | 9/323 |
| 3,741,585 | 6/1973 | Hendrickson et al. | 149/35 |
| 3,883,373 | 5/1975 | Sidebottom | 149/35 |

*Primary Examiner*—Trygve M. Blix
*Assistant Examiner*—Stuart M. Goldstein
*Attorney, Agent, or Firm*—Stevens, Davis, Miller & Mosher

[57] ABSTRACT

An automatically inflating lifesaving buoy device having a gas generating device in which the gas generating composition is ignited by an electric ignition device powered by a water-activated electric cell or battery. The gas then generated is cooled as it flows into an inflatable bag to form the lifesaving buoy.

11 Claims, 4 Drawing Figures

AUTOMATIC INFLATING LIFESAVING BUOY

BACKGROUND OF THE INVENTION

The present invention relates to an automatic inflating lifesaving buoy, which is automatically inflated upon using to form a lifesaving buoy and can be easily handled.

The conventional lifesaving buoys have been mounted on ships and the like in such a state that the lifesaving buoys have been already formed by charging air into a buoy-forming bag and sealing the air to inflate the bag or by charging a light weight substance, such as cork, foamed rubber, foamed plastics and the like and if necessary, said lifesaving buoys are connected to a saving rope. These lifesaving buoys are exposed to sun light and wind containing salt in the state where the lifesaving buoys have been already inflated, so that the deterioration of the material forming the buoy is rapid and it is necessary to continually check their condition and further even upon using, such buoys are relatively bulky and light in weight, so that it is difficult to throw the lifesaving buoy accurately and far. Moreover, a large area is necessary in a convenient location for storing lifesaving buoys so as to be able to use the buoys at an urgent time in the inflated bulk state. Accordingly, the conventional lifesaving buoys have a variety of problems.

Therefore, a variety of lifesaving buoys which are automatically inflated upon using to form said buoys, have been proposed in order to solve these problems. For example, there are U.S. Pat. Nos. 2,786,599, 3,693,202, 3,812,546 and 3,449,777. However, all these devices use a compressed gas bomb as the gas generating source, so that there are problems of gas leakage, lowering of speed for discharging gas under a low temperature circumstance and the like.

Furthermore, the automatic puncturing mechanism of the bomb employs a water soluble substance as a stopper for a spring-loaded puncturing needle (U.S. Pat. Nos. 2,786,599, 3,693,202) or one in which puncturing the pin is actuated by explosive material which is detonated by utilizing a sea water-activated battery (U.S. Pat. No. 3,449,777). In any of these prior art devices there are problems in safety, reliability, rapid actuating ability and the like.

An explanation will be made in more detail with respect to the above described prior art devices. For example, the lifesaving buoy described in U.S. Pat. No. 3,693,202 comprises a gas bomb containing a compressed gas, such as freon gas, or liquefied carbonic acid gas, an automatic opening mechanism for the bomb and a buoy (composed of a flexible polyvinyl chloride sheet), which is inflated by the gas discharged from the gas bomb. The automatic opening mechanism comprises a spring-loaded nozzle capable of puncturing the sealed opening of the gas bomb, the release of which is restrained by a soluble substance. When such a lifesaving buoy is thrown in water, the water soluble substance is dissolved, the nozzle is released and punctures the sealed opening of the gas bomb, whereupon the discharged gas enters into the polyvinylchloride sheet to inflate it and to form the lifesaving buoy.

However, in the above described lifesaving buoy, the automatic inflating system directly utilizes the gas contained in the gas bomb, so that under low temperature, as in winter, the discharge speed of the gas from the gas bomb is slow and it is difficult to inflate the buoy within the necessary time. Further, the charged gas probably leaks from the gas bomb during storage over a long period of time and since the automatic opening mechanism of the gas bomb is actuated by the dissolution of the water soluble solid, a relatively long time is necessary for dissolving the water soluble solid. Therefore, time until the lifesaving buoy is dropped onto sea and is inflated, is not instantaneous but is slow. Since unevenness of the actuating time is large, a safety member is necessary, so that the safety member must be pulled out for the actuation. Thus, this prior art has a variety of drawbacks.

Lifesaving projectile apparatus propelled by the explosive force of gun, in which a gas is generated from a gas generating composition which reacts with a liquid, has been disclosed in U.S. Pat. No. 3,496,580 without using the above described compressed gas. However, in this apparatus, lithium hydride to be used as the gas generating agent is unstable against moisture and the generated gas is hydrogen which is an inflammable dangerous gas, so that this apparatus is disadvantageous in view of safety and reliability. Furthermore, the gas generating composition generates the gas through the reaction with a liquid, such as water, so that this apparatus is readily influenced by temperature and particularly, when water is used, water freezes under a weather condition of lower than 0° C and the reaction with the gas generating composition, such as lithium hydride cannot be fully expected. Thus, there yet remain problems in the above described prior art devices, that is, lowering of the speed for discharging gas and reliability in discharging of the gas.

SUMMARY OF THE INVENTION

The present invention aims to overcome, the above described defects of the conventional lifesaving buoys and provides an automatic inflating lifesaving buoy characterized in that said lifesaving buoy is light weight and does not deteriorate with time and in which the speed gas discharg does not decrease under low temperature and the lifesaving buoy is instantaneously actuated.

The automatic inflating lifesaving buoy comprises a gas generating device including a gas generating composition, an electric ignition device for igniting the gas generating composition, a cooling agent for the gas generated by burning or decomposition of the gas generating composition and a filter for collecting the by-produced solid residues, an inflatable bag which forms a lifesaving buoy and communicates to a gas outlet of the gas generating device, and an electric cell or battery for supplying electric current to the above described electric ignition device.

The buoy is employed as follows.

When this automatic inflating buoy is thrown into sea water or fresh water, said water enters into the electric cell or battery and electric current is supplied to the electric ignition device in the gas generating device. As a result, the electric ignition device is actuated, igniting the gas generating composition to generate gas. This gas is cooled by the cooling agent and passes through the filter, and the cooled filtered gas enters into an inflatable bag, whereby the inflatable bag is inflated to form the lifesaving buoy. Such successive actions of electric actuation, burning, chemical reaction and mechanical action, such as inflation are instantaneously carried out, so that in the lifesaving operation, the automatic inflating lifesaving buoy according to the present invention can be rapidly and accurately used.

The automatic lifesaving buoy according to the present invention can be used by providing a saving rope as in the conventional lifesaving buoy. Furthermore, as exemplified in the explanation mentioned hereinafter, it is possible to make said lifesaving buoy in a shape suitable for throwing, for example, the gas generating device portion is made to be a cylinder, so that the lifesaving buoy according to the present invention is very easy to throw as compared with the conventional lifesaving buoys which have been formed into the buoy form first, and such lifesaving buoy can be thrown accurately to a far target.

The gas generating composition to be used in the present invention includes solid gas generating compositions consisting of at least one metal azide selected from the group consisting of alkali metal azides and alkaline earth metal azides, and at least one metal oxide of copper, iron, nickel, cobalt, lead, manganese and the like.

In addition to these gas generating compositions, solid gas generating compositions consisting of ammonium perchlorate or an organic easily decomposable substance, such as azodicarboxylic amide or aminotetrazol, and an inorganic oxidizing agent or a heat generating composition consisting of a metal and a metal oxide may be used. These solid gas generating compositions, if necessary, may be compounded with an organic binder, such as vinyl acetate resin.

The cooling agent to be used in the present invention includes, for example, aluminum oxide, silicon oxide or mineral particles, such as sand consisting mainly of these substances. In addition, inorganic carbonates, inorganic bicarbonates and the like may be used alone or in admixture with the above described cooling agents.

As the electric ignition device according to the present invention, use may be made of various electric ignition mechanisms, such as the ignition device composed of an electric resistance heating wire, such as nichrome wire, or an electric resistance heating wire and an ignition charge arranged around said wire. It may also be composed of a fuse head obtained by coating a priming composition around a platinum bridge wire and an ignition charge arranged around the fuse head.

The ignition charge to be used herein is a composition consisting of at least one metal of zirconium, calcium, boron and titanium and at least one metal oxide of copper oxide, molybdenum (IV) oxide, bismuth oxide and lead peroxide.

The electric cell or battery to be used in the present invention is activated by the inflow of sea water or fresh water and is generally referred to as the sea water-activated battery, and, for example is commercially available as silver chloride-magnesium sea water-activated battery. However, this sea water-activated battery is not actuated by fresh water, so that in order to activate the electric cell or battery by fresh water, a composition that can form an electrolyte performing the same function as sea water, for example electrolyte particles consisting mainly of sodium chloride, which are packed with a water soluble packing paper, is contained in the above described sea water-activated battery.

As the inflatable bag to form the buoy portion of the automatic inflating lifesaving buoy according to the present invention, use may be made of buoys composed of a flexible composite sheet obtained by laminating at least one of flexible covering substances selected from the group consisting of natural rubber; synthetic rubbers, such as styrene-butadiene rubber, acrylonitrile-butadiene rubber, chloroprene rubber, epichlorohidrine rubber, butyl rubber; and synthetic resins, such as urethane resin, vinyl chloride resin and the like, and a woven fabric of synthetic fibers, such as nylon, vinylon, polyester and the like and/or a woven fabric of natural fibers, such as cotton, hemp and the like.

The present invention will be explained in more detail.

BRIEF DESCRIPTION OF THE DRAWINGS

For a better understanding of the invention, reference is taken to the accompanying drawings, wherein.

DESCRIPTION OF THE PREFERRED EMBODIMENT

Figure 1:
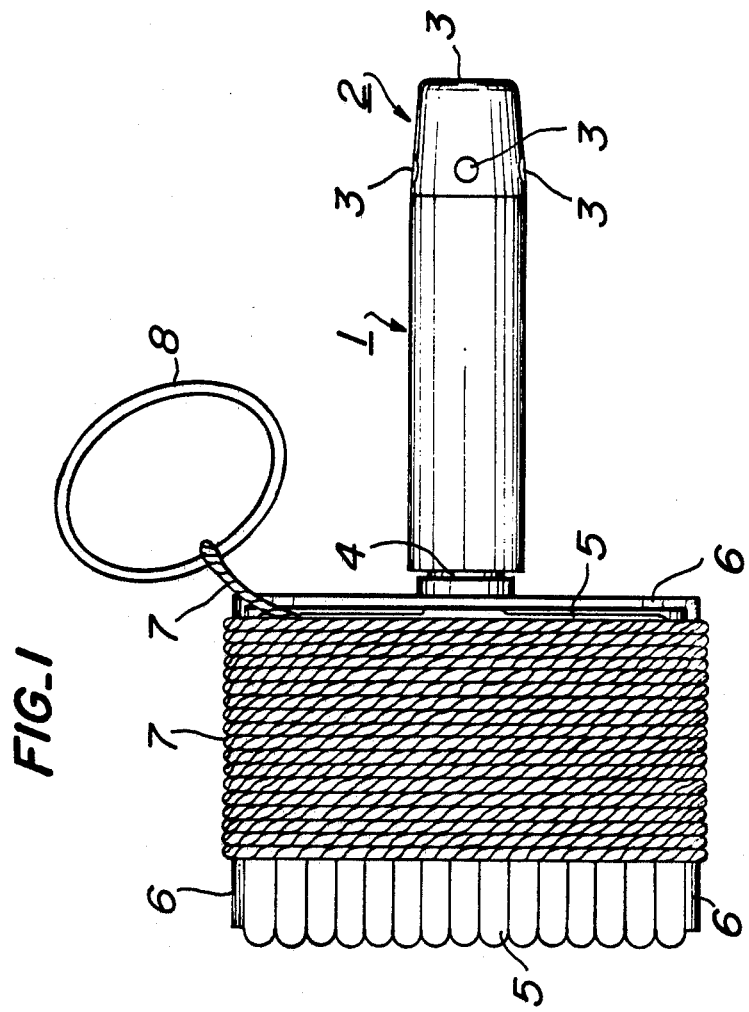
FIG. 1 is a side view of an embodiment of the automatic inflating lifesaving buoy according to the present invention.

Referring to FIG. 1, the numeral reference 1 represents a gas generating device, 2 represents a sea water-activated battery, 3 represents openings for flowing into or flowing out of sea water, 4 represents an outlet of gas, 5 represents a folded inflatable bag forming the lifesaving buoy, 6 represents a holder holding the inflatable bag 5 in the folded state, 7 represents a lifesaving rope, one end of which is connected to the inflatable bag 5, which is wound around the holder 6 and the other end of which is connected to a gripping ring 8.

Figure 2:
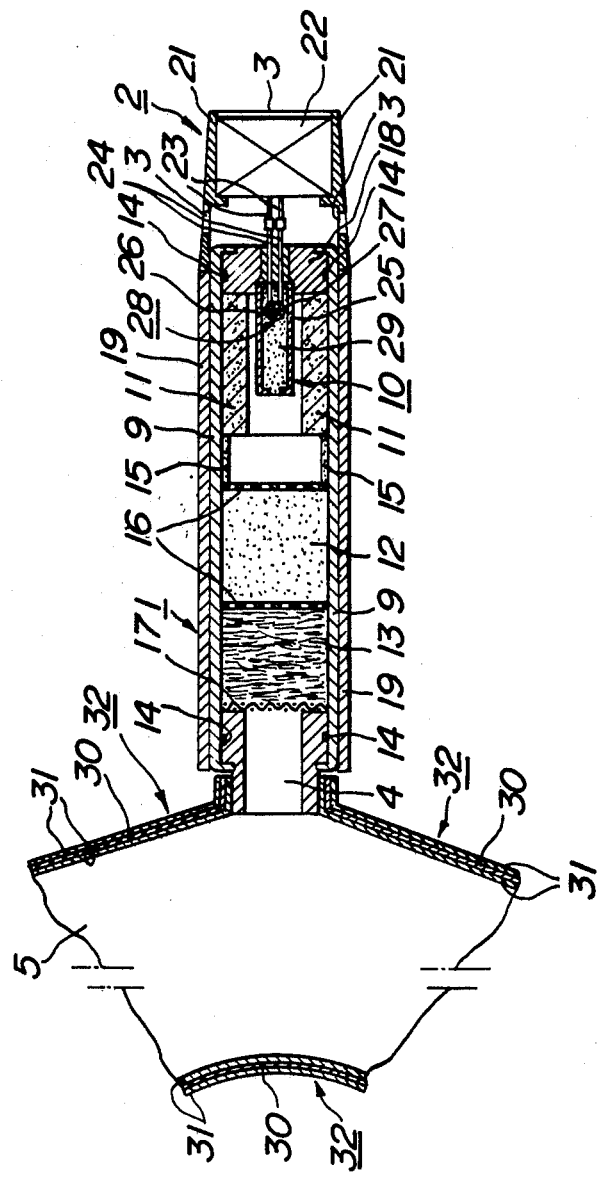
FIG. 2 is a cross-sectional view of the essential portion of the automatic inflating lifesaving buoy shown in FIG. 1.
Figure 3:
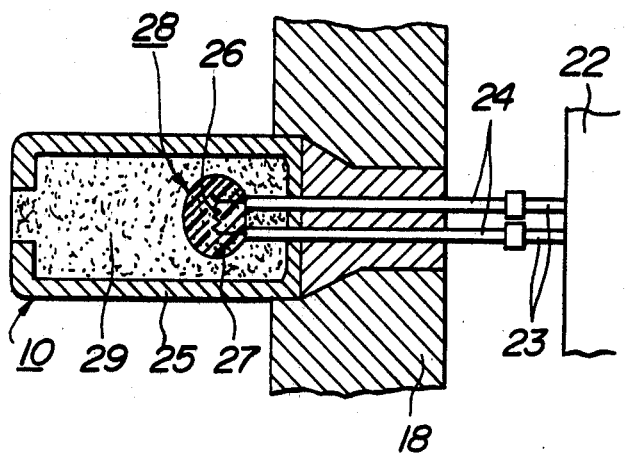
FIG. 3 is an enlarged view of the electric ignition device in the gas generating device of the automatic inflating lifesaving buoy of the present invention.

FIG. 2 is a cross-sectional view for explaining the structure of the gas generating device 1 of the essential part of the automatic inflating lifesaving buoy shown in FIG. 1 and the inflated bag 5. In FIG. 2, the gas generating device 1 is provided with an electric ignition device 10, a solid gas generating composition 11 obtained by molding a composition consisting of 70% by weight of sodium azide and 30% by weight of manganese (IV) oxide into a hollow tube, a cooling agent 12 consisting of aluminum oxide particles and a filter 13 composed of glass wool, rock wool and the like in a cylindrical tube 9 and is provided with a gas outlet 4 at the downstream side of the filter 13. A numeral reference 14 represents a sealing O-ring for preventing the gas leakage, 15 represents a spacer, 16 represents a multi-perforated partition plate, 17 represents a partition wire gauze and 18 represents a bottom plug of the gas generating device. The numeral reference 19 is an insulating and protecting paper cylinder of the gas generating device.

Figure 4:
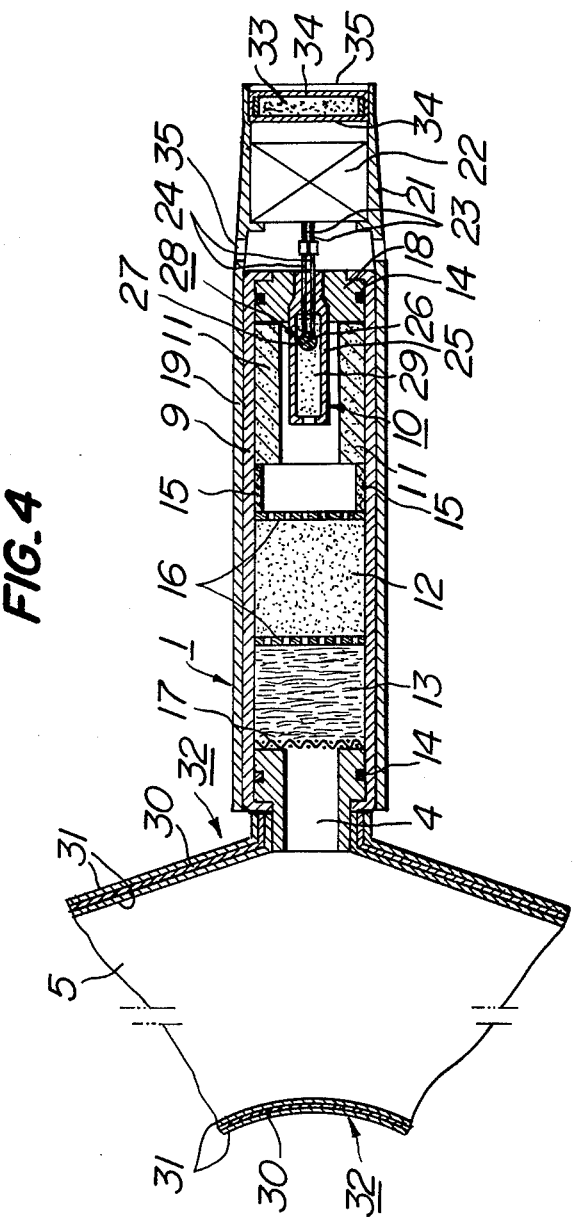
FIG. 4 is an additional cross-sectional view of the essential portion of the automatic inflating lifesaving buoy shown in FIG. 1.

A sea water-activating battery portion 2 is provided with a sea water-activating battery 22 in a battery holder 21 provided with openings 3 for flowing into or flowing out of sea water and the sea water-activating battery 22 connects to leg wires 24 of the electric ignition device 10 by the terminal wires for discharging the electric current. The electric ignition device 10 is provided with a fuse head 27 obtained by coating a priming composition 27 around a platinum bridge wire 26 connected at the top ends of the leg wires 24 and an ignition charge 29 in a case 25. The inflatable bag 5 in this instance as shown in FIGS. 1 and 2 is formed into a buoy form by shaping a flexible composite sheet 32 obtained by laminating urethane resin layers 31 on both surfaces of a nylon fabric 30 and FIG. 2 shows a partially omitted sectional view in the inflated state of an inflatable bag 5. In FIG. 4, 33 shows an electrolyte, 34 shows a water soluble paper, 35 shows an inlet in which fresh water is flowed.

An explanation will be made with respect to the functional effect of the automatic inflating lifesaving buoy shown in FIG. 1 and FIG. 2.

Firstly, the gripping ring 8 of the lifesaving rope 7 of the automatic inflating lifesaving buoy according to the present invention is gripped by one hand and the gas generating device 1 portion is gripped with the other hand to be used for throwing the lifesaving buoy; the lifesaving rope 7 being unwound from the holder 6. When the automatic inflating lifesaving buoy reaches the sea surface, sea water flows into the sea water-activated battery from the openings 3 for flowing into or flowing out of sea water and the sea water-activated battery 22 is immediately actuated and the electric current flows to the platinum bridge wire 26 in the fuse head 28 from the leg wires 24 of the electric ignition device through the terminal wires 23. Then the platinum bridge wire 26 evolves heat and the priming composition 27 ignites and the ignition charge 29 burns and the solid gas generating composition 11 is ignited. The gas generating composition 11 burns and generates nitrogen gas in this example. The generated nitrogen gas at a relatively high temperature is cooled by the cooling agent 12 and passed through the filter 13, whereby the by-produced solid residues are collected and removed and the nitrogen gas is flowed into an inflated bag from the outlet 4 of the gas and the inflatable bag 5 is inflated to form the lifesaving buoy.

The necessary time until the lifesaving bag is inflated to form the lifesaving buoy from the time when the automatic inflating lifesaving buoy reaches the aimed sea water, is within a few seconds.

The above described automatic inflating lifesaving buoy according to the present invention has the following various merits.

(1) The gas for inflating the lifesaving buoy is exothermally generated through burning or decomposition, so that the slow actuation at a low temperature as in the conventional automatic inflating lifesaving buoys, which utilize the conventional gas bomb, does not occur and the unevenness against a broad range of temperature is small and the inflation can be made by the stable gas generation.

(2) Since the solid gas generating composition is used, there is no fear of the gas leakage prior to use as in the conventional gas bomb system of lifesaving buoys, so that there is no anxiety that it becomes impossible to use the automatic inflating lifesaving buoy during storage.

(3) The actuation mechanism of the gas generating device comprises that an electrolytic liquid, such as sea water flows into an electric cell or battery, such as a sea water-activated battery and the electric current is generated, so that a mechanical safety mechanism, such as a safety member is not necessary and during the period when the automatic inflating lifesaving buoy according to the present invention is not used, it is merely necessary to seal the battery portion. Furthermore, the gas generating composition is instantaneously actuated by the electric ignition of the gas generating device, so that the maximum time necessary for completion of the inflation from the beginning of the actuation is a few seconds and the automatic inflating lifesaving buoy according to the present invention is actuated safely, accurately and rapidly.

(4) Since the automatic inflating lifesaving buoy according to the present invention is light weight and small size, the space for housing said buoys is small and therefore it is possible to store said buoys so as not to expose them directly to sun light and salt air during storage and there is no anxiety about deterioration during storage and handling and maintenance are easy.

(5) Since the automatic inflating lifesaving buoy according to the present invention is light weight and small size, said buoy does not bulk as in the conventional lifesaving buoys, so that said buoy can be easily thrown to a far distance and can be thrown accurately against the target.

As explained above in detail, the automatic inflating lifesaving buoy according to the present invention is light weight, small size, is actuated safely, accurately and rapidly, and is easy in handling, so that said lifesaving buoy is useful in ships and the other saving portions and in addition, said buoy is convenient for fishermen, fishing men, yacht racers and the like and the application scope is broad.

What is claimed is:

1. An automatic inflating lifesaving buoy comprising a gas generating device, an inflatable bag and an electric cell or battery, the gas generating device being provided with the electric cell or battery at the rearward end and the inflatable bag at the forward end, the gas generating device being a substantially hollow body in which an electric ignition device is arranged adjacent to the electric cell or battery and/is electrically connected with the electric cell or battery and surrounded with a gas generating composition, and a spacer provided in contact with and in the forward direction of the gas generating composition, a multi-perforated partition plate provided in contact with or integrated with the spacer, another multi-perforated partition plate provided in the forward direction of the first multi-perforated partition plate and at an appropriate distance to form a chamber wherein a cooling agent is charged, and an outlet for supplying generated gas to the inflatable bag through the second multi-perforated partition plate.

2. The automatic inflating lifesaving buoy as claimed in claim 1, wherein said gas generating composition is a solid gas generating composition consisting of at least one metal azide selected from the group consisting of alkali metal azide and alkaline earth metal azide, and manganese (IV) oxide.

3. The automatic inflating lifesaving buoy as claimed in claim 2, wherein said solid gas generating composition consists of sodium azide and manganese (IV) oxide.

4. The automatic inflating lifesaving buoy as claimed in claim 1, wherein said cooling agent is at least one kind of inorganic oxide particles selected from the group consisting of aluminum oxide, silicon oxide and minerals consisting mainly of these substances.

5. The automatic inflating lifesaving buoy as claimed in claim 1, wherein the inflatable bag is a buoy-shaped flexible composite sheet obtained by laminating at least one of flexible covering substances selected from the group consisting of natural rubber, synthetic rubbers and synthetic resins, and a woven fabric.

6. The automatic inflating lifesaving buoy as claimed in claim 5, wherein the inflatable bag is a flexible composite sheet consisting of a urethane resin and nylon woven fabric.

7. The automatic inflating buoy as claimed in claim 1, wherein the gas generating device comprises an electric ignition device provided therein with a fuse head which is ignited by supplying an electric current and an ignition charge arranged around the fuse head.

8. The automatic inflating buoy as claimed in claim 1, wherein the electric cell or battery is sea water-activated.

9. The automatic inflating buoy as claimed in claim 1, wherein the electric cell or battery is sea water-activated and is provided with a vessel enclosing an electrolyte composition consisting mainly of sodium chloride, which dissolves in fresh water and actuates the sea water-activated cell or battery.

10. The automatic inflating lifesaving buoy of claim 1, wherein a partition wire gauze is provided in the forward direction of the second multi-perforated partition plate and in contact with the rear end of the outlet for supplying the gas to form a chamber wherein a filter is charged.

11. The automatic inflating lifesaving buoy of claim 1, wherein the gas generating device is surrounded by insulating paper.

* * * * *